Figure 1:
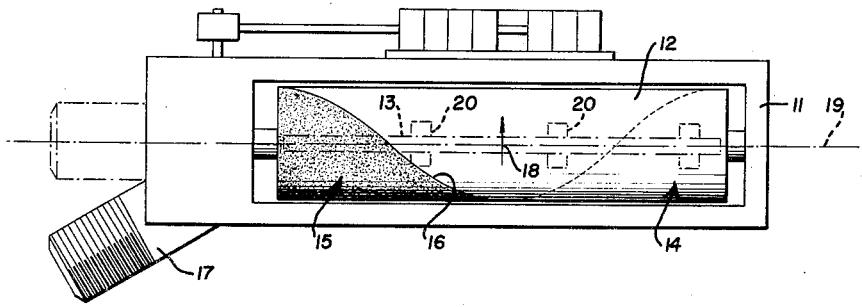

June 5, 1962  F. K. H. NALLINGER  3,037,476
MEASURING INSTRUMENT, ESPECIALLY SPEEDOMETER FOR MOTOR VEHICLES
Filed Feb. 3, 1960

INVENTOR.
FRIEDRICH K. H. NALLINGER
BY
ATTORNEYS

United States Patent Office 3,037,476
Patented June 5, 1962

3,037,476
MEASURING INSTRUMENT, ESPECIALLY SPEED-OMETER FOR MOTOR VEHICLES
Friedrich K. H. Nallinger, Stuttgart, Germany, assignor to Daimler-Benz Aktiengesellschaft, Stuttgart-Unterturkheim, Germany
Filed Feb. 3, 1960, Ser. No. 6,402
Claims priority, application Germany Feb. 7, 1959
18 Claims. (Cl. 116—57)

The present invention relates to a measuring instrument, especially to a speed indicator for motor vehicles, provided with an elongated indicator window extending either essentially horizontally or vertically and with an indicator mark which moves effectively in the longitudinal direction of the window and which is arranged on a roller movable about an axis extending essentially transversely to the direction of the window or on a roller band movable essentially longitudinally with respect to such window.

The present invention aims at an improvement of the known and proposed measuring instruments, especially with respect to the facilitated readability thereof. In particular, the present invention aims at a measuring instrument which permits the driver of a motor vehicle to determine merely from a short look or glance on the measuring device, without having to read any numbers or having to compare the length of the possibly colored contrasting field of the indicator rendered visible with respect to the entire measuring range thereof, to what extent his vehicle speed falls within the individual speed ranges defined, for example, by predetermined speed limits or boundaries.

This task is solved in accordance with the present invention with measuring devices of the type mentioned hereinabove by coordinating or assigning to each velocity range, for example, to the range of 0 to 50 kilometers per hour, 50 to 100 kilometers per hour, etc. a special, separate colored field and to arrange this colored field on the roller or roller band in such a manner that in each speed range the entire indicator line from zero to the particular measured or indicated value visible within the indicator window has the color of the particular speed range. This means that during transition from one speed range to the next, the color of the next speed range is not to be added or adjoined to the color of the preceding speed range but, instead, that the color of the entire indicator line is to change completely in an abrupt manner during such transition.

With a measuring device having a roller rotatable essentially perpendicularly to the window the indicator mark is formed thereon by a separating line extending thereon obliquely, in the manner of a spiral line, between a neutral zone and the colored indicator zones whereby the latter meet each other in separating lines extending essentially parallely to the window.

In connection with an embodiment according to the present invention provided with roller indicator band or tape, the window thereof is inclined at a relatively small angle to the direction of movement thereof and the separating lines of the individual colored indicator zones are arranged among each other with the same inclination. The separating line with respect to the neutral zone may thereby extend perpendicularly to the window or to the direction of movement of the indicator band or tape.

Accordingly, it is an object of the present invention to provide a measuring device, particularly a speed indicator for motor vehicles which permits the driver, by simple means, to recognize, with a mere glance, the speed range in which he travels and the approximate speed with which he drives the vehicle in relationship to the speed range.

Another object of the present invention is the provision of a measuring device provided with an indicator means in which the driver can readily recognize by mere quick inspection the speed range in which he finds himself while driving the vehicle without carefully reading the measuring scale.

Still another object of the present invention resides in the provision of a speed indicator for motor vehicles in which the measuring scale is subdivided into certain speed ranges and in which the indicator line appearing in the indicator window changes colors in a sudden jump-like manner when passing from one speed range to the next at the speed range limits thereof.

Figure 2:
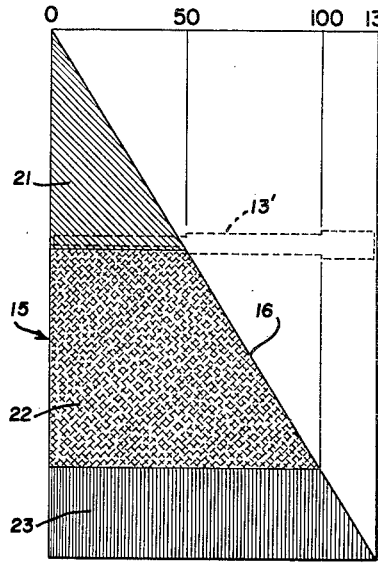
Figure 3:
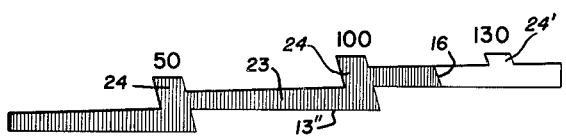
Figure 4:
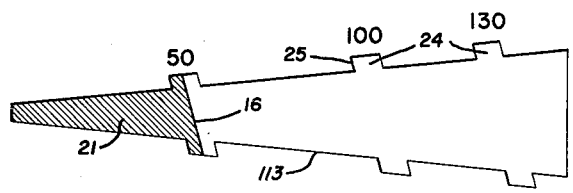
Figure 5:
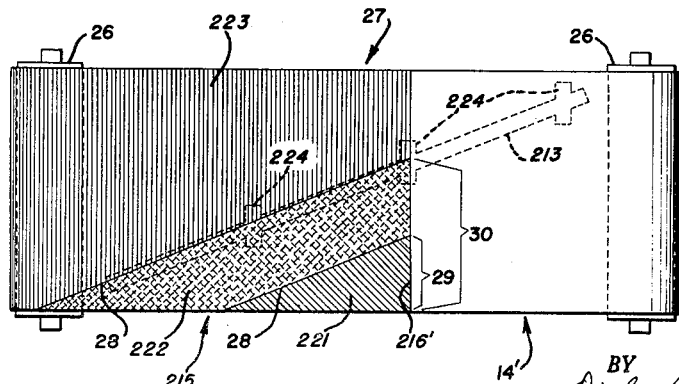

These and other objects, features and advantages of the present invention will become more obvious from the following description, when taken in connection with the accompanying drawing which shows, for purposes of illustration only, several embodiments in accordance with the present invention and wherein:

FIGURE 1 is a schematic front elevational view of a line-indicator tachometer for a motor vehicle in accordance with the present invention provided with an indicator roller member rotatable transversely to the indicator window with the window being shown in phantom section, FIGURE 2 is a plane development of the roller member on a reduced scale in accordance with the present invention that may be used in connection with an embodiment similar to FIGURE 1 and indicating thereon the different indicator zones or fields, FIGURE 3 is a schematic front elevational view on an enlarged scale of a modified window configuration for a speed indicator in accordance with the present invention, FIGURE 4 is a schematic elevational view on an enlarged scale of a still further modified window configuration for a speed indicating device in accordance with the present invention, and FIGURE 5 is a schematic elevational view on an enlarged scale of an indicator band or tape in accordance with a further modification of the present invention with the indicator window being shown in phantom section.

Referring now to the drawing, wherein like reference numerals are used throughout the various view to designate corresponding parts, and more particularly to FIGURE 1, reference numeral 11 designates the measuring frame in which a roller member 12 is rotatably supported so as to be rotatable about the longitudinal axis 19 thereof. A small indicator window 13 is arranged in front of the roller member 12 within the front plate or exposed face of the measuring device which window 13 extends essentially parallelly to the longitudinal axis 19 of the roller member 12. The surface of the roller member 12 is provided with a neutral zone or field generally designated by reference numeral 14 and a indicator zone or field generally designated by reference numeral 15 which meet at a boundary line 16 forming the individual indicator marks and are of different color. The boundary line 16 may additionally be emphasized by a special coloring, for example, by being white.

The roller member 12 is rotated by a predetermined angle in the direction of the arrow 18 by means of a transmission system of conventional, known construction (not shown), such angular displacement of roller member 12, thereby corresponding to the rotary speed of a shaft introduced into the measuring apparatus through the obliquely extending connecting member 17. However, the connecting member 17 may also extend from the frame 11 coaxially with respect to the axis 19 as indicated in dot and dash line in FIGURE 1. With an increasing rotary speed of the shaft led into the measuring device 11 through the connecting member 17, an increasing portion of the indicator zone 15 corresponding to the increasing rotation or angular displacement of the roller member 12 appears in window 13 in the form of an indicator line moving from left to right as viewed in FIGURE 1 whereby one edge of the window 13 is provided with a scale (not shown) for reading the measured value as indicated by the indicator line. The indicator window 13 may also be provided at particular places, for example, at the boundaries of the speed ranges with cut-out portions 20, i.e., may change in width suddenly in a jump-like or step-like manner.

As indicated in FIGURE 2, the indicator field or zone generally designated by reference numeral 15 is subdivided into several zones 21, 22 and 23 of different color. Each of these fields or zones 21, 22 and 23 is coordinated or assigned to a predetermined speed range, and more particularly in such a manner that during transition of the indicator mark 16 from one speed range to the next, the entire indicator line visible in the window 13 appears in the particular color coordinated or assigned to the prevailing speed range. The indicator window 13' in the embodiment of FIGURE 2 is thereby set off in a step-like manner from speed range to speed range. The separating lines of the various zones 21 to 23 of different color extend parallel to each other and parallel to the longitudinal axis or direction of the window 13'.

For example, for the first speed range of 0 to 50 kilometers per hour, a green zone or field 21 may be provided. As long as the indicator mark 16 moves within the speed range of 0 to 50 kilometers per hour, a green line is visible in the first narrow portion of the window 13' which becomes increasingly longer as the velocity increases. The next colored zone or field 22 may be provided, for example, in orange color. The length of the separating line 16 between the zones 21 and 22 corresponds to the distance of the range limits from the scale zero point. The orange zone 22 may thereby encompass, for example, a speed range from 50 to 100 kilometers per hour. Above 100 kilometers per hour, a colored zone 23, for example, of red color may be visible through window 13' which warns the driver that in the ensuing speed range an increased attention and concentration will be required of him.

If the roller member 12 moves from the position indicated in FIGURE 2 in the upward direction as viewed in FIGURE 2, then the zone 22 with the orange color moves within the area of the indicator window 13'. And more particularly, as soon as such transition takes place, the orange indicator line becomes visible from the zero point of the scale up to the particular end of the mark 16 corresponding to the prevailing speed. This condition continues to prevail until the limit of the next speed range is reached, which may be arranged, for example, at 100 kilometers per hour. As soon as the next speed range limit is attained, then the separating line 16 forming the indicator mark for the particular prevailing speed between the two zones 22 and 23 reaches the second step in window 13' and therewith the entire indicator line again changes its color.

According to FIGURE 3, the indicator window 13" is constructed in a step-like manner so that it forms, so to speak, by the particular configuration of the edges thereof, a readable indicator scale. The construction of the roller member 12 with the indicator zones thereof is thereby the same as in FIGURE 1 or FIGURE 2. Additionally, at the places at which numerical indications are provided, projecting cut-out portions 24 and 24' may be provided along the upper and/or lower edges of the window 13". Upon attaining the particular velocities, the window and cut-out portions 24 and 24' are filled out by the corresponding color zone 21 or 22 or 23 of the roller member 12 so that a noticeable and clearly visible marking of the respectively attained, prevailing velocity range results therefrom. In the illustrated position of the mark 16 of FIGURE 3, the indicator zone 23 appears as a red colored zone. With any of the preceding embodiments of the indicator windows of FIGURES 1-3, it is also understood that one or the other lateral edge portions thereof may increase continuously in each range.

FIGURE 4 illustrates an indicator window 113 in which both edge portions thereof extend obliquely with respect to each other in a mirror-image-like manner, and more particularly a window results therefrom which becomes increasingly wider with an increasing measured or indicated value. Additionally, cut-out portions 124 are again provided at the speed range limits. The edge 25 of these cut-out portions 124 is inclined in the same direction as the indicator mark 16, a feature which may also be applied to the embodiments described hereinabove in connection with FIGURES 1–3.

According to FIGURE 5, the indication takes place by means of a band or tape 27 guided over two roller members 26 which moves essentially in the longitudinal direction of the indicator window 213. The indicator window 213 is thereby inclined at a small angle with respect to the direction of movement of the band 27. An indicator mark 16 extending perpendicularly to the band 27 or to the window 213 subdivides the band 27 into a neutral zone 214 and into an indicator zone 215 which in turn again consists of several, for example, three colored zones or fields 221, 222 and 223. The separating lines 228 between the zones 221, 222 and 223 thereby extend parallelly to the axis of the window 213. The heights 29 and 30 correspond to the speed range boundaries at which the window again is provided with cut-out portions 224.

The operation of the embodiment of FIGURE 5 is in principle the same as in the preceding embodiments. As soon as the band or tape 27 thereof together with the mark 216 moves from the position thereof indicated in FIGURE 5 toward the right, then the colored zone 223 begins to appear through the entire window portion 213 effectively visible. If the band 27 moves toward the left, then at first the colored zone 222 appears in the window 213 and upon further reduction of the speed the colored zone 221 becomes visible.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

I claim:

1. A measuring device, especially speed indicator for motor vehicles, having elongated window means and indicator means forming an indicator line with the indicator mark thereof movable effectively in the longitudinal direction of said elongated window means and corresponding in length thereof to the speed of the vehicle, said indicator means forming said indicator line being subdivided into a plurality of indicator zones of dieffrent color corresponding to different predetermined speed ranges to thereby render visible an indicator line through said window means which changes its color from the zero point thereof to the prevailing speed in conformity with the particular speed range within which falls the prevailing indicated speed, each indicator zone of different color having its color extending from the zero point of the measuring device to the predetermined speed range associated with each indicator zone, said plurality of different color zones being so arranged whereby in each speed range the color corresponding thereto is visible from the zero point to the indicator line thereof.

2. A measuring device according to claim 1, wherein said indicator window means is arranged essentially horizontally.

3. A measuring device according to claim 1, wherein said indicator means includes roller means rotatable about an axis extending essentially transversely to the longitudinal direction of said window means.

4. A measuring device according to claim 1, wherein said indicator means includes tape means movable essentially in the longitudinal direction of said elongated window means.

5. A measuring device according to claim 4, wherein said tape means is provided with a plurality of different color zones arranged thereon in such a manner that in each speed range the color corresponding thereto is visible from the zero point to the indicator line thereof.

6. A measuring device according to claim 3, wherein said roller means is provided with a plurality of color zones with different colors thereof corresponding to said speed ranges, said color zones being so arranged on said roller means that in each speed range the corresponding color is visible from the zero point to the indicator line thereof.

7. A measuring device according to claim 1, wherein said indicator means includes a rotatable roller member rotatable essentially perpendicularly to said window means, said indicator mark being formed by an inclined separating line between a neutral zone and the colored indicator zones extending along said roller member essentially spirally, and wherein the indicator zones of different color meet each other in separating lines extending essentially parallelly to said window means.

8. A measuring device according to claim 1, wherein said window means is arranged at a slight inclination with respect to the direction of movement of said indicator means, and wherein the colored indicator zones on said indicator means have the same inclination as said window means.

9. A measuring device according to claim 8, wherein said indicator means includes movable tape means on which said colored indicator zones are arranged, and wherein said window means extends at a slight inclination with respect to the longitudinal direction of movement of said tape means.

10. A measuring device according to claim 9, wherein said separating line between said neutral zone and said colored indicator zones extends approximately perpendicularly with respect to the direction of one of the two parts consisting of said window means and of said tape means.

11. A measuring device according to claim 10, wherein the separating line between said colored indicator zones and said neutral zone has a color different from the color of any one of said zones.

12. A measuring device according to claim 1, wherein said indicator means is provided with a neutral zone and a plurality of indicator zones of different color different from one another and different from said neutral zone, the color of said neutral zone corresponding to the visible color of the front face of said measuring device surrounding said window means, and said neutral zone and indicator zones being separated from each other by a separating line having a color different from the color of any one of said zones.

13. A measuring device according to claim 1, wherein said window means is provided with a scale, and wherein said window means changes in width thereof in a jump-like manner at the boundaries of certain speed ranges.

14. A measuring device according to claim 13, wherein said changes in width are formed by large visible cut-out portions provided in the longitudinal edges of said window means.

15. A measuring device according to claim 13, wherein the longitudinal edges of said window means are set off in a step-like manner from speed range to speed range with both edges set off in the same direction.

16. A measuring device according to claim 13, wherein the width of said window means increases continuously within each speed range.

17. A measuring device according to claim 1, wherein said window means is provided with jump-like changes along the longitudinal edges thereof at the boundaries of said speed ranges and wherein the edge portions at said changes have the same inclination with respect to the longitudinal axis of said window means as the indicator mark appearing therein.

18. A measuring device, especially a speed indicator for motor vehicles, having elongated window means and indicator means forming an indicator line with the indicator mark thereof movable effectively in the longitudinal direction of said window means and corresponding in length thereof to the speed of the vehicle, said indicator means including a rotatable roller member rotatable essentially perpendicularly to said window means and being subdivided into a plurality of indicator zones of different color corresponding to different predetermined speed ranges, said indicator mark being formed by an inclined separating line between a neutral zone and the colored indicator zones extending along said roller member essentially spirally, each color zone extending from the zero point of the indicator up to and including the predetermined speed range associated therewith, said indicator zones of different color meeting each other in separating lines extending substantially parallel to said window means, said different color zones being so arranged upon said roller member so that in each speed range the color corresponding thereto is visible from the zero point to the indicator line thereof, and said window means including zones of increasing thickness corresponding to the predetermined speed ranges, said zones of said window means being defined by edges of said window means which are set off in a step-like manner from speed range to speed range in a mirror image-like manner whereby the width of said window means reaches a maximum in the highest of said predetermined speed ranges so that the warning that the motor vehicle is operating in the highest speed range is more easily visible.

References Cited in the file of this patent

UNITED STATES PATENTS

| | | |
|---|---|---|
| 2,254,242 | Righi | Sept. 2, 1941 |
| 2,276,504 | Mendelson | Mar. 17, 1942 |
| 2,309,941 | Drummond | Feb. 2, 1943 |
| 2,802,442 | Helgeby | Aug. 13, 1957 |